Oct. 31, 1933.　　　G. J. BUCHNER　　　1,933,241
METHOD OF MANUFACTURING RETURN ENDS
Filed March 17, 1928　　　5 Sheets-Sheet 1
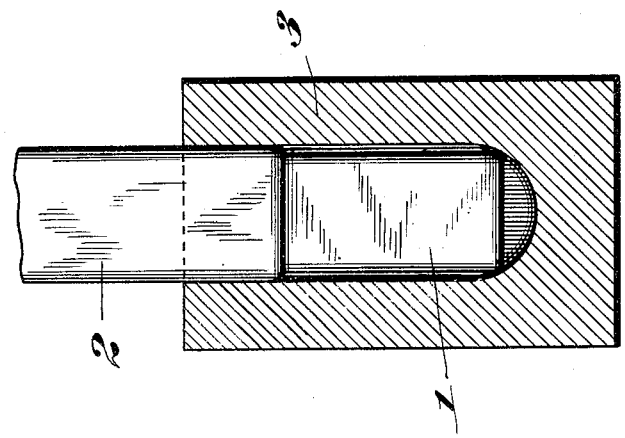
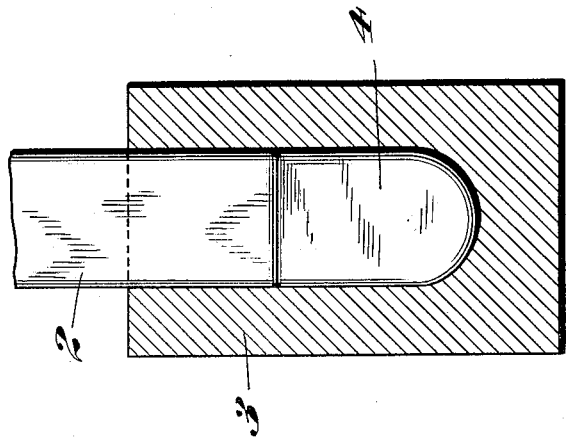
INVENTOR
George J. Buchner
BY R. S. A. Dougherty
ATTORNEY

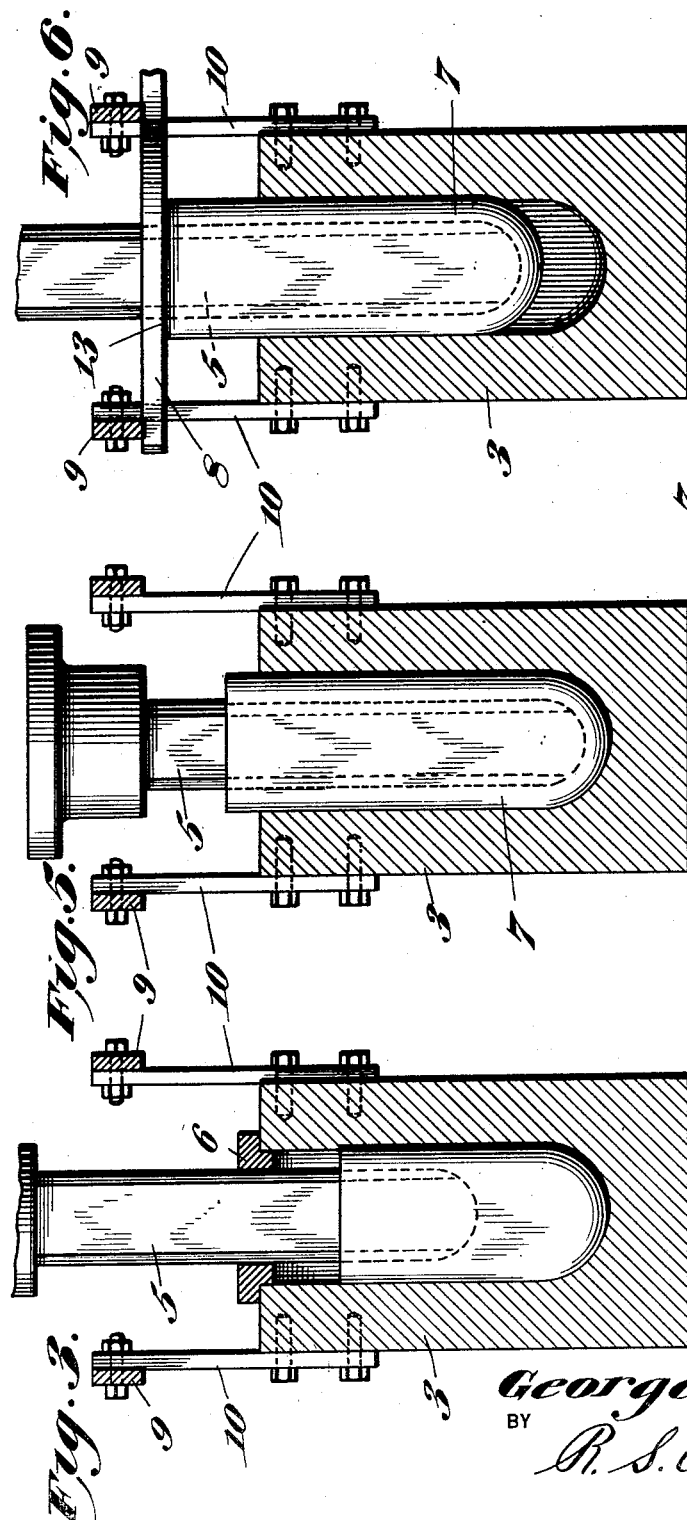
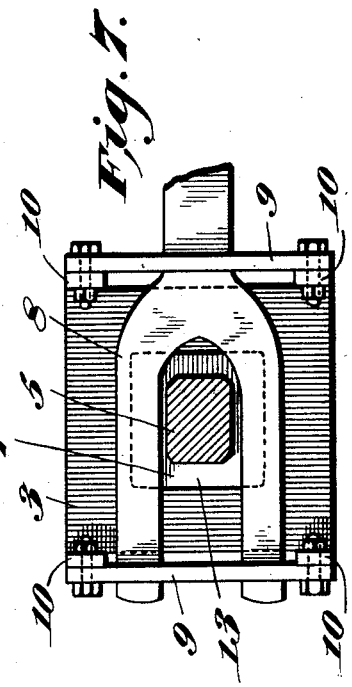
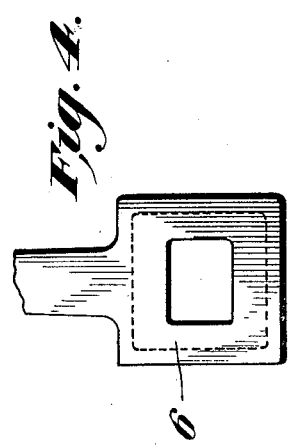

Oct. 31, 1933.  G. J. BUCHNER  1,933,241
METHOD OF MANUFACTURING RETURN ENDS
Filed March 17, 1928   5 Sheets-Sheet 3
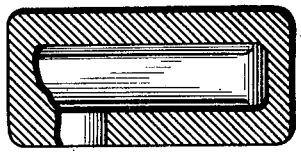
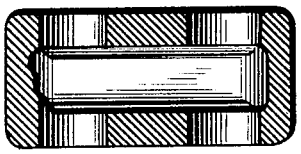
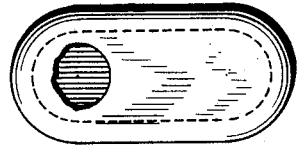
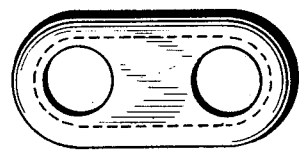
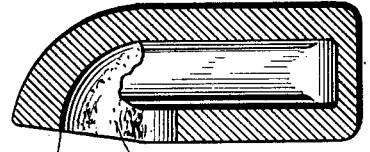
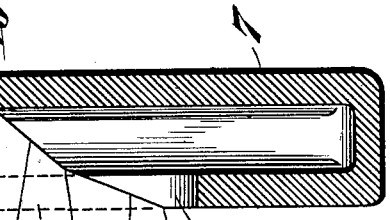
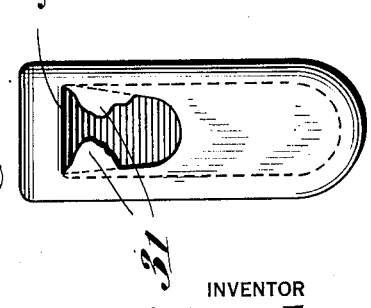
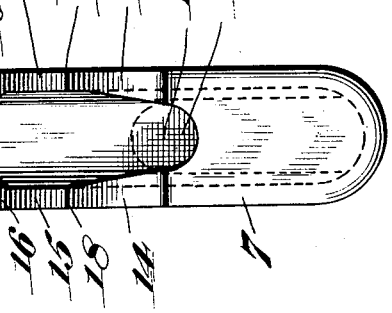
INVENTOR
George J. Buchner
BY
R. S. A. Dougherty
ATTORNEY

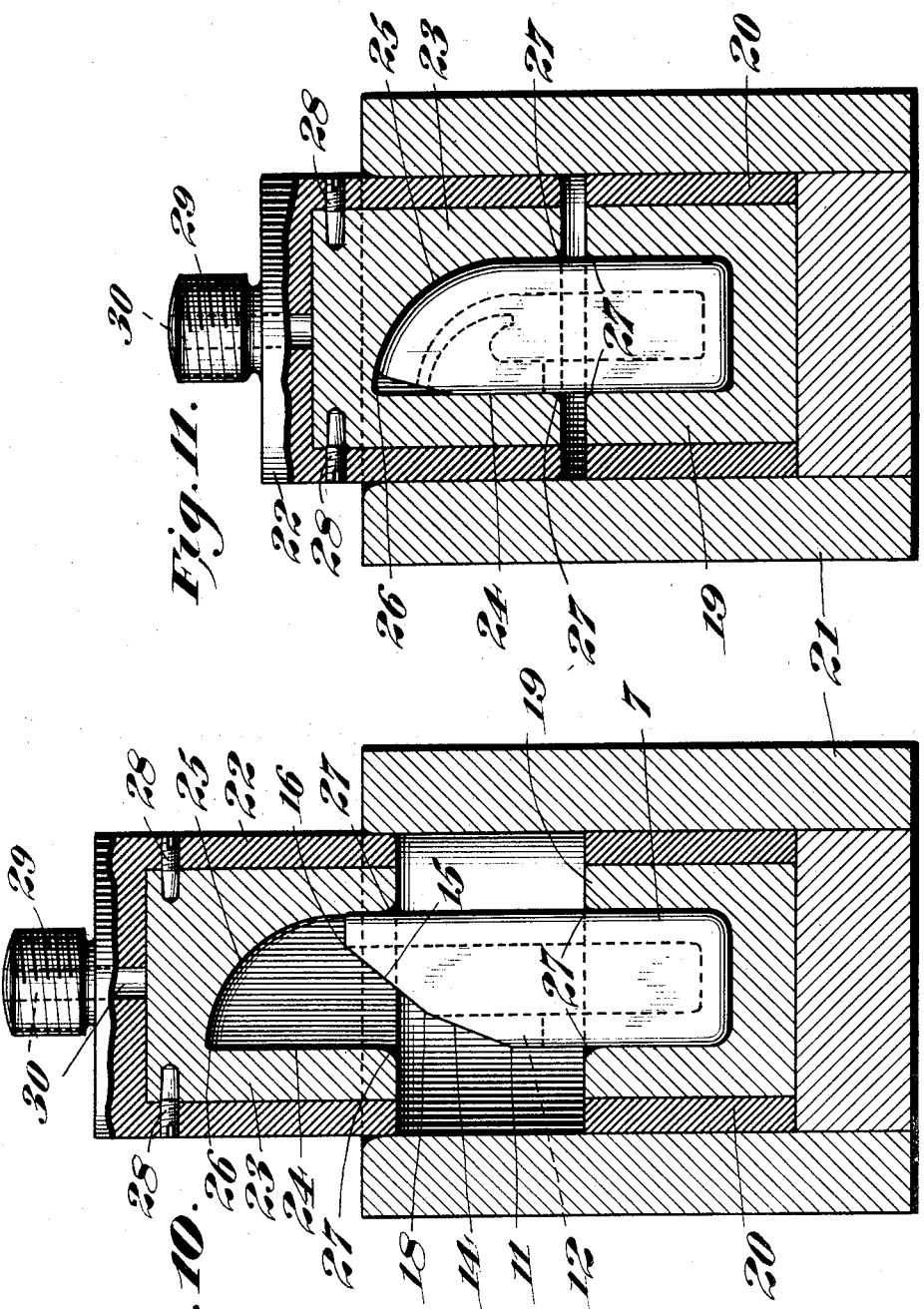

Oct. 31, 1933.   G. J. BUCHNER   1,933,241
METHOD OF MANUFACTURING RETURN ENDS
Filed March 17, 1928   5 Sheets-Sheet 5
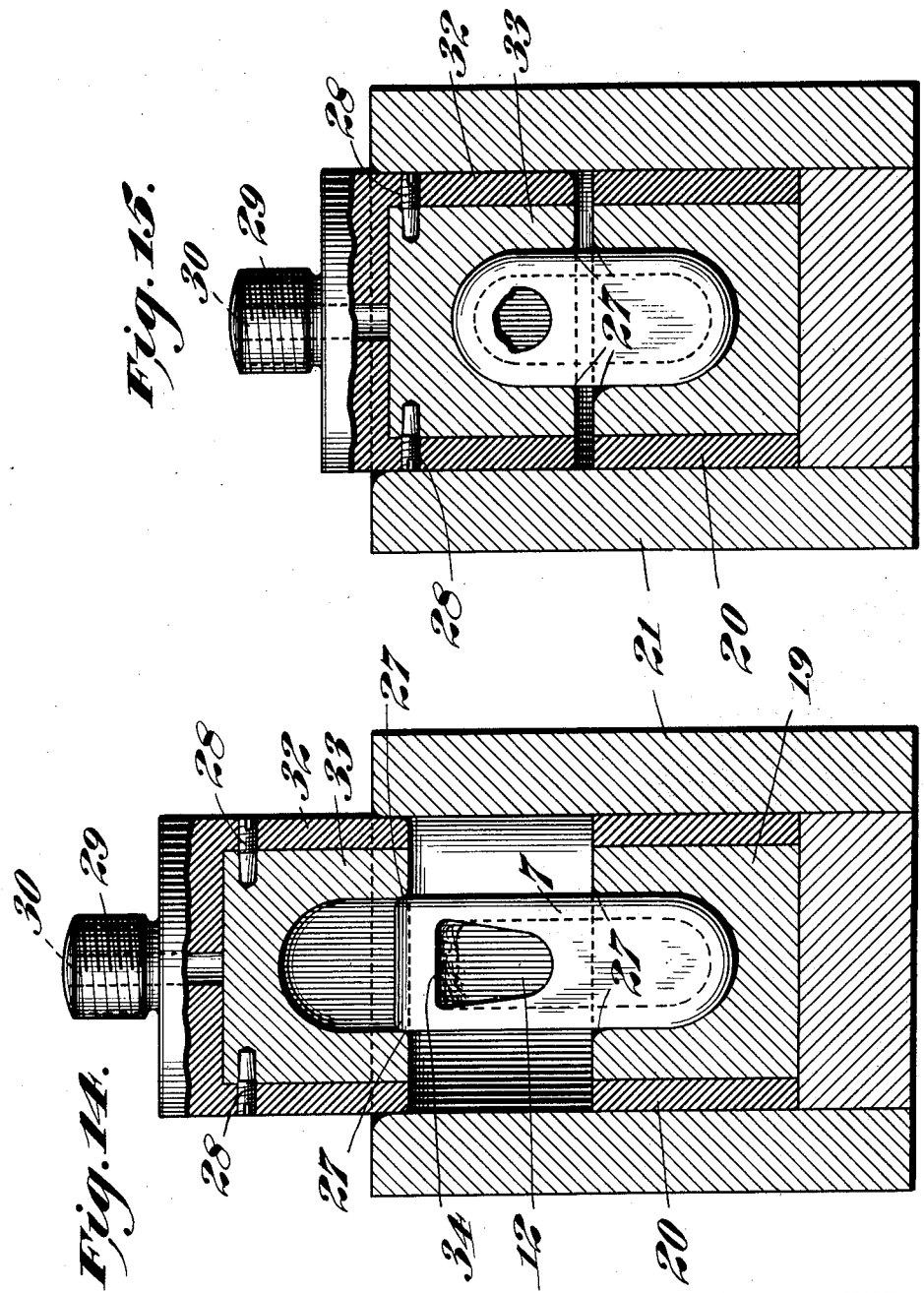
INVENTOR
*George J. Buchner*
BY
*R. S. A. Dougherty*
ATTORNEY Patented Oct. 31, 1933

1,933,241

UNITED STATES PATENT OFFICE 1,933,241

METHOD OF MANUFACTURING RETURN ENDS

George J. Buchner, Bethlehem, Pa., assignor to Bethlehem Steel Company

Application March 17, 1928. Serial No. 262,463

6 Claims. (Cl. 29—157.6)

My invention relates to a return end or header for connecting the ends of pipes or tubes for use in various conducting systems subject to high temperatures and pressures. More particularly my invention relates to devices for making a forged return end or header of the hollow box type.

An object of my invention is to obtain a forged return end of the hollow box type which will withstand high temperatures and pressures.

Another object of my invention is to obtain a return end of the hollow box type consisting of a forging which is seamless and weldless.

A further object of my invention is to provide a method of forming a seamless, weldless and plugless return end or header.

Heretofore forged steel return ends have been made in various ways as follows:

They were drop forged and bored out of the solid, the open end was then closed with a threaded plug of the same diameter as the bored hole and the edge of this joint was welded. The second method was to punch a forging in a hydraulic press, and bottle in the upper end so as to reduce the diameter of the plug needed to completely close the end. In each case, the required holes for the tubes and cleanout holes were bored in the forgings.

In the two above mentioned methods, a threaded plug is required to close the opening formed by the boring out or punching operation. The threaded joint constitutes a weak part in the forging and is apt to leak as a result of the metal around the plug being expanded by pressure and heat and it is also an additional item of manufacturing cost.

In my present invention, instead of closing in the forging with the hole in the top and plugging it, I propose to close it in so that the hole will come on the front, at a location which will subsequently be bored out for a tube, thus eliminating the weak features of the previous types, and at the same time produce a return end which is seamless, plugless and weldless, except for the holes and plugs required for the tubes and cleanout holes. My invention will provide a stronger and more reliable fitting at no ultimate additional cost.

The novel features of my invention will be more fully understood from the following description and claims taken with the drawings in which:

Fig. 1 represents a solid billet within a die, about to be upset;

Fig. 2 represents a solid billet within a die, after it has been upset;

Fig. 3 illustrates the first stage of punching an upset blank forging;

Fig. 4 is a plan view of a guide for the punch, as used in the first stage of punching;

Fig. 5 illustrates the final stage of punching the forging;

Fig. 6 illustrates a method of stripping the forging from the punch;

Fig. 7 is a plan view of the die and punch, showing a forked tool used in the stripping operation;

Figs. 8 and 9 illustrate front and sectional views respectively, of the hollow forging as bored and cut preparatory to the first closing operation;

Fig. 10 shows the prepared hollow forging within a set of dies at the beginning of the first closing operation;

Fig. 11 shows the forging within the dies at the end of the first closing operation;

Figs. 12 and 13 are front and sectional views respectively, of the hollow forging after the first closing operation;

Fig. 14 illustrates a front view of the forging as prepared for the final closing operation, and the dies for performing the same at the start of said operation;

Fig. 15 is a front view of the finished return end forging within the dies at the end of the final closing operation;

Figs. 16 and 17 illustrate front and sectional views respectively of the finished return end forging;

Figs. 18 and 19 illustrate front and sectional views respectively of the return end, bored for pipe connections and cleanout plugs.

Referring now to the drawings: a return end according to my invention is made from a solid piece of steel or other suitable metal, which, after being suitably heated is operated upon by a punch 2, and die 3 as shown in Fig. 1. This operation consists of upsetting the solid billet to conform to the inside shape of the die which is preferably rectangular in cross section and rounded at the bottom. This forms the plain billet into a solid forging 4, rectangular in cross section, rounded on the bottom and flat on the top as shown in Fig. 2. The solid forging is now operated upon without removing from die 3, by a punch 5, preferably rectangular in cross section. The first step of this operation consists in placing a guide 6, over the top opening of die 3 to guide the punch 5 and hold it central as it enters the blank forging. After the punch has centered itself in the forging, the punch is withdrawn and the guide 6 removed. The punch again operates on the partially punched forging and the result is the extruded forging 7, as shown in Fig. 5. The next step in the punching operation is to withdraw the punch from the punched forging, and to accomplish this a forked tool 8, as shown in Figs. 6 and 7, is placed over the top of the forging and straddling the punch. As the punch is withdrawn, bringing with it the punched forging, the forked tool 8 is brought to a stop by cross bars 9 attached to vertical members 10 which are secured to the sides of the die 3. In this manner the forging 7 is held from being further withdrawn from the die 3 and the punch 5 strips itself from the forging. Suitable tongs are employed to grasp and lift the forging from the die.

Inasmuch as the foregoing method of making a hollow forging from a solid blank is old and well known to those experienced in the art, my invention starts with the preparation of the hollow forging and the method of closing the open end.

Referring now to Figs. 8 and 9, at a point 11 approximating the location of a tube, a hole 12 of smaller diameter than the inside opening of the forging is bored through a face of the hollow forging and the remaining portion of metal between the center of the hole and the top of the forging 13 and of a width tapering from that of the diameter of the hole to the inside width of the punched opening, is removed by cutting or burning. At the point 11 and extending upwardly and rearwardly along lines 14 and 15 to a point 16 adjacent the rear wall the two corner sides and front portion of the forging are cut off as represented by dot and dash lines 17 thus providing angularly formed side walls. Cutting off the sides and front of the forging along lines 14 and 15 which are in different planes, forms a hump or protruding portion at 18 for the purpose hereinafter explained.

The next step in the operation is to suitably heat the upper end of the cut-off forging to a point slightly below the bottom of the hole 12. The heated forging is now ready to be operated upon between upper and lower dies as shown in Fig. 10. The lower or holding die 19 is hollowed out to conform to the outside shape of the lower end of the forging 7, and is confined within a circular filler sleeve 20 and an outside circular body member 21, which acts as a holder for the lower die 19 and a guide for the top die carrier 22. Within the carrier 22 is secured an end closing die 23, which is open at its lower end to conform to the outside shape of the forging. The inside front face 24, and the end faces are straight and vertical, while the rear face 25 is straight at its bottom portion and curves upwardly and forwardly joining the inside front face 24 with a radius 26. The edges at the openings of both upper and lower dies are provided with radii 27, for entering purposes. The upper die 23 is secured within its carrier 22 by means of set screws 28. The carrier 22 is provided with a threaded portion 29 for securing the said carrier to the head of a power press. A hole 30 is drilled through the top of the carrier to allow the introduction of a rod to facilitate the removal of the die 23 from its carrier 22.

As the upper die closes in on the lower die, the upper end of the forging 13 is bent forwardly over the bored hole 12, and as point 18 lies outside of a line between points 11 and 16 these portions of the side walls are also forced toward the straight face 24 of the die, and the excess metal 31 in the side walls is forced into the opening within the forging adjacent to the bored hole, due to the confining action of the die. The raised portions 18 of the side walls act as reinforcements to resist any buckling or folding tendency of the side walls, and at the same time produce a toggling action along lines 14 and 15 to start and direct the forward movement of that part of the side walls in the direction of the front of the forging. Figs. 12 and 13 illustrate substantially the shape and appearance of the forging after the first closing operation, with the excess metal of the side walls protruding in the hollow portion of the forging. These protrusions are burned or cut out before the final closing operation takes place and the face of the forging 7 then presents the appearance, as shown in Fig. 14.

The forging is now subjected to a further and final heating, and closing operation in the dies shown in Figs. 14 and 15. As will be seen, the parts 19, 20 and 21 are the same as used in the first closing operation while the top die carrier 32 is shorter than part 22 for the first operation. The end closing die 33 differs from that of die 23 inasmuch that it is shorter and the opening within the die is semicircular on top, curving in a plane opposite to that of die 23 and conforms to the shape of the lower die 19 in order to form a similar rounded end. Other general features being the same as in the first closing operation. To complete the closing operation, the reheated partially closed forging is placed in the lower die 19 with the open end up and the upper die 33 forced downwardly closes in the upper edge 34 of the forging over the bored hole 12 in a manner shown in Fig. 15, leaving a hole of bored smoothness on the bottom but rough and irregular on top.

As a result of the method above described, a forged return end or header is produced with a hole in the front of the forging as shown in Figs. 16 and 17, at a location which will subsequently be bored out for a tube, thus eliminating the necessity of plugging this opening and furthermore providing a fitting of superior strength and durability because the punches and dies act upon a continuously homogeneous body of metal, which has not been previously slit or welded, and which is formed and closed without seams or welds.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. The method of manufacturing return ends for connecting pipes or tubes which comprises forming a hollow forged blank closed at one end and open at its other end, said blank at its open end being formed angularly with respect to its axis so that its wall at one side is shorter than the wall at the opposite side, said short wall having a V-shaped opening extending from the open end of said blank a predetermined distance longitudinally thereof, and shaping the blank to completely close the open end thereof and to completely enclose said opening formed in the wall of the blank.

2. The method of manufacturing return ends for connecting pipes or tubes which comprises placing a hollow blank having but one open end in a die, shaping the open end of said blank with a die having a concaved surface, and further shaping said end with another die having a surface which is concaved in a direction at right angles to the direction of curvature of the first mentioned die so as to close the open end of said blank.

3. The method of manufacturing return ends for connecting pipes and tubes which comprises forming a hollow blank of rectangular cross section which is closed at one end and open at the other end and having substantially flat front and rear walls and having the side walls connected by a curved bottom portion, forming an opening in the front wall, removing a portion of the blank at its open end from a point adjacent said opening to a point adjacent the rear wall so that the front wall is made shorter than the rear wall and the ends of the side walls are inclined with respect to the front wall, bending the rear wall toward the front wall and angularly with respect to the axis of the blank and to enclose the opening in the front wall, removing a portion of the material thus gathered, and shaping the end thus closed to conform to the shape of the blank at its other end.

4. The method of manufacturing return ends for connecting pipes or tubes which comprises forming a hollow blank closed at one end and open at the other end, forming an opening in the front wall, removing the corner of the blank at its open end extending from the opening in the front wall to a point adjacent the upper end of the rear wall so as to provide angularly formed side walls, deforming a portion of the material of the rear wall forwardly to close the open end of said blank, and forming the end thus closed into semicircular shape in the direction transverse to the side walls.

5. The method of manufacturing return ends for connecting pipes or tubes which comprises placing an open ended hollow blank having one side longer than the other side in a die, shaping the open end of said blank with a die so as to bend the longer side over the shorter side, and further shaping said end with another die to close the open end of said blank and form an opening in one of its sides.

6. The method of manufacturing return ends for connecting pipes or tubes which comprises placing a hollow metal forging having one side longer than the other side in a die, bending the longer side over the shorter side, and further pressing said bent portion in a direction longitudinal to the axis of the forging to bring said bent portion flush with the outside face of the shorter side of the forging body.

GEORGE J. BUCHNER.